Jan. 15, 1924.
L. A. SWEET
AUTOMOBILE LOCK
Filed Jan. 29, 1920
1,480,794
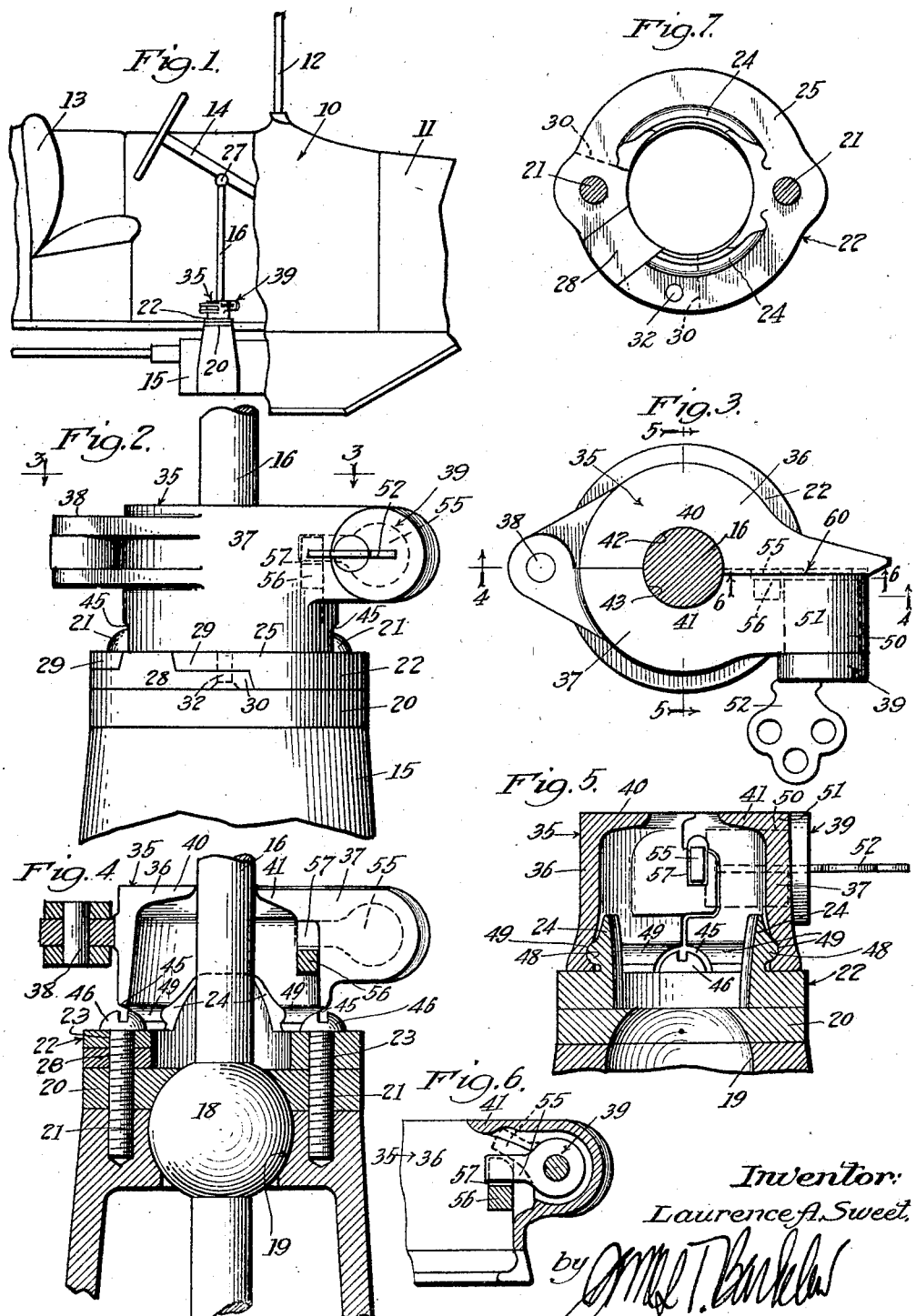
Inventor:
Laurence A. Sweet,
by [signature]
his Attorney Patented Jan. 15, 1924.

1,480,794

UNITED STATES PATENT OFFICE.

LAURENCE A. SWEET, OF LOS ANGELES, CALIFORNIA.

AUTOMOBILE LOCK.

Application filed January 29, 1920. Serial No. 354,943.

*To all whom it may concern:*

Be it known that I, LAURENCE A. SWEET, a citizen of the United States, residing at Los Angeles, in the county of Los Angeles, State of California, have invented new and useful Improvements in Automobile Locks, of which the following is a specification.

This invention relates to an automobile lock and more particularly to a lock for locking an automobile transmission so that the gears therein can not be shifted. It is an object of the invention to provide a device of this general character that is simple, sightly, effective, and inexpensive to manufacture.

The invention is more particularly, or specifically, directed to provide an effective, simple lock for a transmission shift lever, mounted on a universal joint or the like, such as a ball and socket joint, or the like, to hold the lever immovable. The lock when in position is adapted to hold the shift lever against movement and in the preferred form of the invention the device is designed to hold the shift lever in the central position or in the position in which the gears are in neutral.

A particular feature of the invention is the provision of a lock of the character above set forth which can be removed from the shift lever when unlocked thereby allowing free and unrestricted movement of the shift lever. This is an important and noteworthy feature of the invention as devices of this general character which remain on the shift lever when unlocked are more or less inconvenient and tend to interfere with the manipulation of the lever. The construction of the device provided by the invention is simple, and neat making it easily and conveniently removed from the shift lever and preventing it from being cumbersome or in the way while it is in place on, or after it has been removed from, the shift lever.

There are further objects and features of the invention which will be best understood from the following detailed description of a preferred embodiment of the invention throughout which reference is had to the accompanying drawings, in which—

Fig. 1 is a view showing the lock provided by the invention in position on a typical automobile; Fig. 2 is an enlarged side elevation showing the lock; Fig. 3 is a plan view of the same, being a view taken as indicated by line 3—3 on Fig. 2; Fig. 4 is a detail section taken as indicated by line 4—4 on Fig. 3; Fig. 5 is a detail section taken as indicated by line 5—5 on Fig. 3, with the shift lever removed; Fig. 6 is a detail section taken as indicated by line 6—6 on Fig. 3; and Fig. 7 is a plan view of the base provided by the invention.

Throughout the drawings numeral 10 designates a typical automobile having a hood 11, windshield 12, seat 13, steering wheel 14, transmission gear case 15, and a shift lever 16 for the gears within the case 15. It will be readily understood that the invention is not limited or restricted in any way to embodiment in, or use in connection with, an automobile of the particular design and arrangement herein set forth, but that such design and arrangement is merely to illustrate a typical automobile in connection with which the device provided by the invention can be used.

The transmission gear case 15 shown in the drawings is of the type commonly used in automobiles and the shift lever 16 is connected to the transmission gear case 15 by a universal joint. The universal joint is made by a ball 18 formed on the shift lever 16 and adapted to seat, or be carried, in a socket 19 formed in the gear case 15. A suitable retaining ring 20 fits around the upper portion of the ball 18 and is attached to the case 15 by suitable screws 21 thereby preventing displacement of the ball 18 from the socket 19. This particular form or design of universal joint between the casing 15 and the shift lever 16 is merely typical and it will be understood that the invention is not in any way limited or restricted to such a joint but that it may be arranged in connection with practically any form of universal joint construction.

To provide a machine with the device provided by the present invention the screws 21, which secure the ring 20 to the casing 15, are removed and a base 22 is placed on top of the ring 20 and is firmly attached thereto by replacing the screws 21 so that they extend through suitable holes 23 in the base 22, through the ring 20, and into the casing 15, as clearly illustrated in Fig. 4 of the drawings. The base 22 is a ring shaped structure having two upwardly extending projections 24, curved concentric with the base and arranged diametrically opposite each other. The base 22 comprises a yoke shaped member 25 which may be placed on or around the shift lever 16 without removing the knob 27, at the top of the shift lever, and which is adapted to be locked around the shift lever 16 by a plate 28. The plate 28 extends between the ends 29 of the yoke shaped member 25, as clearly shown in Figs. 2 and 7 of the drawings. It will be noted in the drawings that the ends 30 of the plate 28 and the ends 29, of the yoke shaped member 25, overlap and are secured, or held together, at one end by a suitable screw 32 and are secured, or held together, at the other end by one of the screws 21. This construction makes the base 22 particularly strong and rigid and also makes it particularly simple in construction. In practice to install the base 22 the yoke shaped member 25 is placed around the shift lever 16 and the plate 28 is attached to the yoke shaped member 25 by the screw 32 while the yoke shaped member is near the top of the shift lever 16, thereby permitting easy and convenient insertion of the screw 32 from the underside of the base 21. When the screw 32 has been properly put in place the base 22 may be lowered onto the ring 20 to receive the screws 21. It will be readily understood how the screw 32 being put in from the underside of the base 22, positively prevents its being removed while the base 22 is in place on the ring 20.

When the base 22 has been properly installed, as above set forth, the shift lever 16 may be positively locked or secured in the central or neutral position by the clamp 35 being locked around the shift lever 16 and to the base 22. The clamp member 35 comprises two jaws 36 and 37 hinged together at 38 and adapted to be locked together and around the shift lever 16 by a suitable lock mechanism 39. The two jaws 36 and 37 when together or in the locked position form a cylindrical structure and are provided at their upper ends with inwardly extending flanges 40 and 41 notched at 42 and 43, respectively, to receive the shift lever 16 when the clamp member is in place. The lower ends of the clamp jaws 36 and 37 are adapted to seat on the upper face of the base 22 there being suitable notches 45, in the lower end of the clamp member 35 at the points where the clamp jaws 36 and 37 abut, to receive the heads 46 of the screws 21. The heads 46 of the screws 21 engaging the notches 45 in the manner shown throughout the drawings prevent rotation of the clamp member 35 and make it impossible to remove the screws 21 while the clamp member 35 is in place. The clamp member 35 is held or locked to the base 22 when the clamp jaws 36 and 37 are together by outwardly extending flanges 48 on the outer faces of projections 24 engaging and extending into suitable notches 49 formed in the jaws 36 and 37 at their lower edges, as clearly shown in Figs. 4 and 5 of the drawings. This manner of locking or securing the clamp member 35 to the base 22 is extremely simple and is strong and effective.

The lock mechanism 39, provided for locking the clamp jaws 36 and 37 together around the shift lever 16 and to the base 22, is preferably an ordinary key operated lock mechanism carried in a casing 50, adapted to be arranged in a suitable projection 51 formed on one of the clamp jaws. The operating key 52 is adapted to be placed in the casing 50 in the manner shown in the drawings, to operate a catch 55 at the inner end of the casing 50. The catch 55 engages a notch 57, in a projection 56 which extends inwardly from the opposite clamp jaw, to positively lock or hold the jaws together. In Figs. 5 and 6 of the drawings it is clearly illustrated how the catch 55 engages the notch 57 in the projection 56 to hold or lock the clamp jaws together and the dotted lines in Fig. 6 indicate the position to which the catch may be moved by the key 52 to unlock the clamp jaws 36 and 37 to allow them to be swung open or apart. It will be noted in the drawings, that one of the clamp jaws is provided with a flange which overlaps the other jaw when the clamp is in position thereby preventing a saw or like device being inserted between the clamp jaws to cut or break the catch 55.

The device provided by the invention when in place on a machine positively prevents its unauthorized operation. When it is desired to operate the machine the clamp member 35 may be completely removed from the shift lever 16 and placed in any convenient or suitable part of the machine thereby being out of the way so that it does not inconvenience or hinder the driver.

It will be understood that the device provided by the present invention is not specifically limited to being attached to a gear case as I have hereinabove described; it might be attached to any part which corresponds to a gear case or which will act as a suitable support. Therefore it is to be understood that when I use the term gear case that I do not necessarily mean specifically a gear case but that I mean to include any part or parts that may correspond to the gear case hereinabove described.

Having set forth a preferred embodiment of my invention I do not wish to limit or restrict myself to the particular details hereinabove set forth but wish to reserve to myself any changes or modifications that may appear to those skilled in the art or that may fall within the scope of the following claims.

Having described a preferred form of my invention, I claim:

1. In combination with a gear case and a lever universally mounted thereon, a base adapted to attach to the case, the base comprising two parts adapted to be assembled around the lever and a screw for securing said parts together around the lever and arranged so that it is held against displacement by the case when the base is in engagement therewith, means for securing the base in engagement with the case, and a clamp adapted to be locked to the base and to the lever to prevent movement of the lever.

2. In combination with a gear case and a lever universally mounted thereon, a base encircling the lever and mounted on the case, the base having projections with outwardly extending flanges, and a clamp adapted to be locked around and to the lever and to the base, the clamp having inwardly extending projections adapted to engage the outwardly extending flanges when it is locked around the lever.

3. In combination with a gear case and a lever universally mounted thereon, a base, screws for mounting the base on the gear case, a clamp completely detachable from the base and adapted to be locked around and to the lever and locked in connection with the base against removal therefrom, the clamp directly engaging the screws to prevent their removal and to prevent rotation of the clamp.

4. In combination with a gear case and a lever universally mounted thereon, a base encircling the lever and mounted on the case at the mounting of the lever, the base comprising two members adapted to be assembled around the lever to be inseparable when in place on the case, the base having projections with outwardly extending flanges, and a clamp comprising two jaws hinged together, and adapted to be locked around the lever to grip it at a point removed from the mounting of the lever and having inwardly extending flanges adapted to engage the outwardly extending flanges to hold the clamp on the base.

5. A device for locking a lever mounted on a universal joint comprising, a stationary base, a projection on the base, a clamp for engaging the lever adapted to cover the projection and be connected to the base by engagement with the projection, and means for locking the clamp in engagement with the projection.

In witness that I claim the foregoing I have hereunto subscribed my name this 22d day of January 1920.

LAURENCE A. SWEET.

Witness:
VIRGINIA I. BERINGER.